Nov. 3, 1925.
J. F. HORNE
MILK STRAINER
Filed Jan. 21, 1924
1,560,471
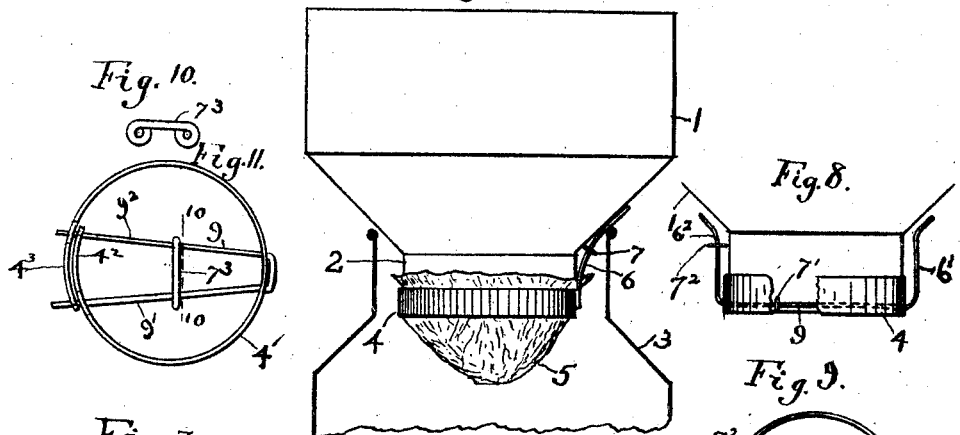
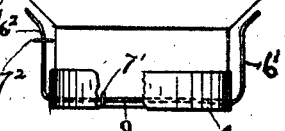
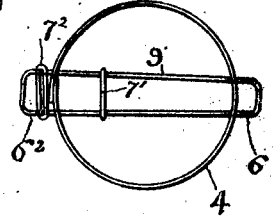
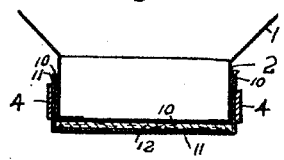
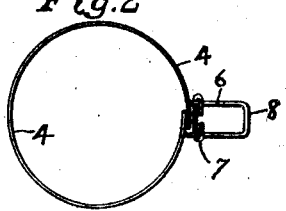
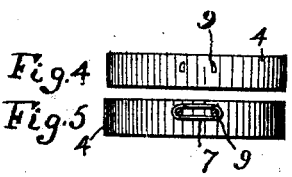
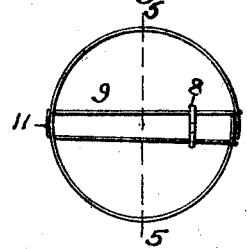
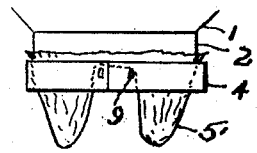
Inventor:
John F. Horne
by S. W. Bates Atty.

Patented Nov. 3, 1925.

1,560,471

UNITED STATES PATENT OFFICE.

JOHN F. HORNE, OF PORTLAND, MAINE.

MILK STRAINER.

Application filed January 21, 1924. Serial No. 687,420.

*To all whom it may concern:*

Be it known that I, JOHN F. HORNE, a citizen of the United States, residing at Portland, in the county of Cumberland and State of Maine, have invented certain new and useful Improvements in Milk Strainers, of which the following is a specification.

My invention relates particularly to a milk strainer for straining milk in comparatively large bodies as it is poured from the pail.

In ordinary dairy practice, the milk is drawn from the cows into pails and strained into cans preparatory to being collected and cooled.

It is common practice to strain the milk through a hopper having a cylindrical discharge outlet, the same being inserted into the open mouth of the can. These hoppers have comparatively small straining area disks generally made of wire gauze placed on the inside of the discharge outlet and covered with absorbent cotton and the like.

The milk does not pass freely through such material and a considerable body of milk is liable to accumulate above the straining surface putting the latter under a considerable hydraulic head and forcing dirt through the interstices of the straining material. It is also true that in this form of strainer a piece of perforated tin and wire gauze are placed in contact with a sheet of cotton with the expectation of forming a straining surface, the perforated metal plate being used for the purpose of holding the cotton disks in place.

In practice, as soon as the milk begins to pass down through the cotton the latter swells and expands many times its original bulk forcing the cotton into the holes or draining openings choking them to such an extent that they are practically impervious to the warm milk. As a consequence of this construction the milk instead of passing down through the cotton has a tendency to pass directly down through the outer edge of the metal disk or adjacent thereto and thus gets into the can without being strained at all.

It thus has come to be recognized that the cleanest and most efficient form of strainer is one in which a large straining surface is used, free from metals of any kind in which the milk runs through as fast as poured and where no considerable amount of pressure is present to force dirt through the straining surface.

According to my invention, I make use of a straining hopper having a discharge outlet, a straining cloth or a piece of straining material being secured to said outlet so as to completely fill the same to prevent the milk passing through without being strained.

Preferably I make use of a piece of textile material placed over the outlet with a clamping device for clamping the same to the outlet.

With such a clamping device I clamp the straining bag to the outside of the outlet, securing the same so that the whole of the bag or any desired portion may hang down and form the straining bag.

It is of course, understood that this straining material may be handled as indicated with a single thickness or more than one thickness so that the thickness of the strainer may be controlled in reference to the material to be strained.

I have illustrated in the accompanying drawing several forms of my invention in which:—

Fig. 1, is a vertical central section through the hopper and the upper end of the milk can showing the straining cloth, clamping device and outlet in elevation and illustrating one of the several forms of my clamping device, Fig. 2 is a plan of the clamping device shown in Fig. 1, Fig. 3, is a plan of another form of the same, Fig. 4 is an elevation of the clamp shown in Fig. 3, Fig. 5 is a section through the line 5—5 of Fig. 3, Fig. 6 is an elevation of the clamping device showing the divided bag clamped in place, Fig. 7 is a vertical section showing a special arrangement of strainer cloths, Fig. 8 is an elevation of an alternate form including the lower end of the hopper, Fig. 9 is a plan of the same showing the clamp alone, Fig. 10 is a section on the line 10—10 of Fig. 11 and Fig. 11 is a plan of a modification of the connecting loop and its relation with the band.

Referring to Figs. 1 and 2 of the drawing, 1 is the hopper, 2 is the cylindrical outlet therefor and 3 is the upper end of the can into which the milk is strained.

The strainer cloth 5 is clamped over the outlet by a clamping device which is readily applied and removed and which will hold the cloth strongly in place without danger of slipping off.

As here shown, I make use of a clamp composed of an incomplete circular band 4 having overlapping or independent ends which may be drawn toward or by each other or separated to decrease or increase the circumference of the hoop and to grip the cloth 5 strongly.

As here shown, the ends of the hoop are drawn together or separated by a generally U-shaped connection loop 6 somewhat wider at the end joining the ends of the hoop than at the opposite or bent end 8.

In the form shown in Figs. 1 and 2, one end of each of the sides of the connecting loop is secured to one of the ends of the band so that as the ends of the connecting loop are drawn together, the ends of the band are drawn inwardly and the band contracted.

The ends of the connecting loop 6 are drawn toward each other by a ring 7 which incloses the sides of the connecting loop 6.

As the ring 7 is made to slide along the diverging portion of the two limbs, the ends of the band 4 are drawn together or by each other.

As shown in Fig. 1, the connecting members extend upwardly in to contact with the inclined surface of the hopper and are firmly held between the hopper and the mouth of the can, thus lessening the liability of slipping of the band 4 from the end of the outlet.

In Figs. 3, 4, 5, and 6 is shown another form of my clamp in which the U-shaped wire 9 extends across and through the band, each of the two ends of the loop passing through near one of the ends of the band with the ends of the band overlapping, sufficient margin being allowed so that the band may hold the cloth tightly.

At the point where the wires pass through the band, they are loosely held or may be soldered to make a solid construction.

The simplest and most preferable way of clamping my device however, is to pass the wires of my U-shaped clamp through the band without soldering or other rigid connection.

As shown herein, the connecting member is slightly wider at its double end than at its bent end so that the ring may slide from one end toward the other and produce a powerful binding effect.

The wire connecting part may be formed in other ways to form diverging portions which will be drawn together by the ring when slid longitudinally of the U-shaped connection. This means of clamping the cloth to the outlet enables me to make use of more than one thickness of cloth, resulting in more perfect straining of the milk than where the latter passes through a single thickness of material. The number of thicknesses of material which may be used depends upon the amount of contraction produced by the ring.

It is evident that the U-shaped connecting member is not necessarily integral or in one piece but may be otherwise formed, as for instance, the bent end 11 of Fig. 3 may be removed and the straight sides soldered directly to the band without any material effect except to weaken the structure, the function of the parts remaining the same. The form shown in Figs. 3, 4, 5 and 6 is that which I prefer for the reason that the connecting members 9 form a double bar extending across the outlet, separating the cloth into two parts which drop down, forming two separate straining bags 5' as shown in Fig. 6. It will be understood that the cloth when formed into a bag by the weight of the milk is far more efficient than when the milk passes down through a relatively flat surface as there is not so great a tendency to force the dirt through the straining surface. Again, in the bag form of strainer, there are several times more surface than in the flat form. The milk passes through more rapidly without so much pressure behind it; a thicker cloth may be used and cleaner milk is the result.

Another advantage of the form shown in Fig. 1 is that by interposing the connecting member 6 between the hopper and the can, a space is left for the escape of air which is necessary in a rapidly working device of this kind. In actual use, my strainer is capable of taking care of the milk as it is poured into the can from the pail.

In Fig. 7, I have shown a method of using the straining cloths which produces particularly good results. It is sometimes required to make use of sheets of absorbent cotton and to have the milk pass through this. In Fig. 7, the disk of absorbent cotton 12 is placed between two pieces of cheese-cloth 10 and 11. The cheese-cloth is clamped by the band 4 around the outlet of the hopper.

In Figs. 8 and 9 I have shown an overlapping form of band with a generally U-shaped connection between the two parts of the band. The end of the connection 9 is turned upwardly outside of the band 4 to rest closely adjacent to the hopper portion of the strainer so as to leave a space between the strainer and the can for the escape of air. The two sides of the U-shaped wire 9 make a slight angle with each other so that the band is made to decrease in circumference as the ring 7' is drawn longitudinally of the wire 9 and toward the left.

6' and 6² are the upturned ends of the connections 9 which are interposed between the hopper and the can, 7², is the locking ring which acts on the turned up end 6². This acts in conjunction with the ring 7' which acts on the wires 9.

In Figs. 10 and 11 I have shown a band with a loop connection adapted to be expanded outwardly so that the straining material instead of being clamped on the outside of the nozzle is clamped on the inside with a band which expands it against the inner surface of the cylindrical ends of the strainer instead of clamping it on the outer surface.

For this purpose the band 4 is made with overlapping ends as in the other form of the device.

The locking device 7³ consists of a single piece of wire turned at each end to produce an eye which allows the two sides of the loop 9 to pass loosely through the two eyes formed in the part 7³.

To expand the band 4' the part 7³ is drawn longitudinally to the left of the loop 9 so as to expand the overlapping free adjacent ends of the band 4'.

The free or expanding ends 9' and 9² of the loop each pass through the overlapping ends 4² and 4³ of the band 4'.

The portion 9² passes through a hole a trifle larger than the wire itself in the end 4² and through an elongated slot in the end 4³. The portion 9' makes just the reverse connection, that is, it passes first through a slot in 4² and then through a smaller hole in 4³. Thus the two wires will have a chance to expand the wire passing through the small hole in one end of the band passing through a slot in the opposite end of the band.

I find that wherever connecting or U-shaped loops pass through the band it is more effective in causing the fabric to hug closely to both the nozzle and the band by allowing the wire to pass loosely through the holes in the band rather than to solder or otherwise secure the wire to the band as it passes through.

When the wire is soldered to the band there is more liability of forming a wrinkle or fold in the cloth and thus holding the straining cloth less firmly in place with more liability to slip when the weight of the milk is thrown on it.

It will be understood that while I have shown a simple specific device for clamping the straining cloth on the outside of the discharge nozzle I do not desire to limit myself to this particular form of clamp which I have described but I desire my invention to be understood as broad enough to include any form of clamp which may accomplish the same result.

While I have shown the hopper as having sloping sides and a cylindrical outlet which is the usual form of hopper, used for straining milk, it is evident that any structure which will guide the milk as it is poured into the can will be the equivalent of the parts I have shown.

In practice I find that it is not always safe to rely on a simple U-shaped connecting device as shown for instance, in Fig. 3 with a single locking member 8 for drawing the ends of the clamp together for it may happen that the band does not fit sufficiently close to the strainer cloth at all points so that some portion of the cloth may be allowed to come loose.

To overcome this difficulty I prefer to bend up one end of the connecting loops at one end of the device as shown in Fig. 8 with a locking member 7' locking the wires 9 and a locking member 7² locking the upright portion 6².

In the ordinary practice of putting the fabric on the straining hoppers the latter is turned bottom end upward, the circular sheet of fabric is carefully laid in place and having been cut in circular form a trifle larger than the diameter of the nozzle and the band is then pushed over the end of the nozzle to draw the fabric smoothly in place and the band is then tightened to firmly secure the fabric in place. It will be seen that the band must be placed evenly about the end of the nozzle and forced evenly down onto the same, otherwise, one of the edges of the strainer cloth is liable to get out of place and so leave a space not covered and thereby cause the strainer to leak.

It is also very important in pushing the band onto the end of the nozzle that it shall not be allowed to slip but it should be held at the exact edge of the end of the nozzle.

In view of the accuracy with which the band and the strainer must be applied to hold the strainer cloth in its position it becomes necessary to provide a stop or guide by which to prevent the latter from sliding too far or to the exact position required on the nozzle.

It will be seen that in my device the rod or wires 9 act to clamp the band and also to act as a stop when the band is placed over the nozzle and the cloth.

By the aid of these stops the band can be quickly put in place and pressed down to just the exact position to hold the band and the cloth in place, and the action can be carried out, largely if necessary by feeling and without good light to see by.

It is obvious that there are many ways in which this clamping band may be made and many ways the stops may be applied but the requisite is that the band shall be made to stop the motion of the band automatically.

It will be understood that my nozzle is not necessarily in the form of a perfect cylinder but it may be polygonal or other equivalent form over which the fabric may be clamped and held.

Claims:—

1. A clamping device for clamping a straining cloth or the like to the outside of a cylindrical body, consisting of a band surrounding the body having two adjacent free ends, a connecting loop having its two ends connected one to each end of the band and a locking ring adapted to slide longitudinally on said loop for drawing together the two sides of said loop.

2. A clamping device for clamping a straining cloth or the like on the outside of a cylinder consisting of a circular band having free adjacent ends, a substantially U-shaped connecting loop having each of its ends secured to one of the free ends of said band, the double end of the loop being wider than the bent end and a ring adapted to slide longitudinally on said loop for drawing the ends toward each other and allowing them to separate.

3. A milk strainer consisting of a hopper, a cylindrical nozzle therefor, a support for the hopper, a band adapted to surround said nozzle, a U-shaped spring connection having each of its ends connected with one of the adjacent ends of the band, the bent over end of said connection extending upwardly in contact with said hopper, and between it and its support and a ring adapted to slide longitudinally on said connection for drawing the ends of the band toward each other to clamp said cloth in position.

4. A milk straining device including a hopper, a discharge nozzle therefor, having a cylindrical outlet, a piece of straining fabric covering said outlet, an incomplete band having free ends for clamping said fabric to said outlet, a connecting loop generally U-shaped in form, the two opposing sides extending in the same plane and in diverging direction, the ends of said sides each connecting with one of the free ends of said band and a clamping ring inclosing the two opposing sides of said loop and adapted when drawn longitudinally of said loop to move the free ends of the same in opposing directions to change the length of circumference of said band for clamping said fabric against said band.

5. A milk strainer including a hopper having a cylindrical nozzle, a piece of straining fabric for said nozzle, a clamping band surrounding the end of said nozzle and a stop for limiting the longitudinal motion of said band on said nozzle as it is slipped on the end of said nozzle, said stop extending across the band and supporting the fabric centrally thereof.

6. In a milk strainer including a hopper having a cylindrical nozzle, a piece of straining fabric for said nozzle, a clamping band surrounding the end of said nozzle and stopping wires extending across the end of said nozzle to limit the longitudinal motion of said band as it slips onto the end of the nozzle.

7. A milk straining device consisting of a hopper, a cylindrical outlet for said hopper, a piece of straining fabric fitting over said outlet, clamping band for clamping said fabric over the end of said outlet, said band being formed of an incomplete circle having two free ends, a generally U-shaped loop passing through openings in each of said ends and extending across the band to support the fabric centrally thereof and a sliding ring for sliding said ends inwardly to contact said circular band.

JOHN F. HORNE.